United States Patent
Blankenship et al.

[19]

[11] Patent Number: 5,927,919
[45] Date of Patent: Jul. 27, 1999

[54] SPRING LOADED BUSHED WEDGELOCK

[75] Inventors: Thomas O. Blankenship; James L. Morrison, both of O'Fallon; Robert O. Becker, Florissant, all of Mo.

[73] Assignee: McDonnell Douglas Corporation, St. Louis, Mo.

[21] Appl. No.: 09/036,766

[22] Filed: Mar. 9, 1998

[51] Int. Cl.$^6$ .............................. F16B 13/06; F16B 21/00
[52] U.S. Cl. .................. 411/60.1; 411/64; 411/371.2; 411/999
[58] Field of Search .................. 411/14, 57, 60, 411/371, 552, 999, 371.2, 60.1, 63, 64

[56] References Cited

U.S. PATENT DOCUMENTS

| | | | |
|---|---|---|---|
| 4,537,542 | 8/1985 | Pratt et al. | 411/60 X |
| 4,892,449 | 1/1990 | Croxton | 441/14 X |
| 4,936,726 | 6/1990 | Medard | 411/371 X |
| 5,228,731 | 7/1993 | Glass | 411/60 X |
| 5,688,093 | 11/1997 | Bowers | 411/552 |

OTHER PUBLICATIONS

"WedgeLock", Temporary Fastening Systems and Drilling Aids by Monogram Aerospace Fasteners Co., by Monogram Aerospace Fastners Co., South Garfield Ave, Los Angeles, Calif. 90022 (dated 1990).

*Primary Examiner*—Neill Wilson
*Attorney, Agent, or Firm*—Alston & Bird LLP

[57] ABSTRACT

The wedgelock of the present invention prevents the separation of structural members during drilling or other fabrication operations on structural assemblies with curved surfaces or thickness variations and precludes the formation of burrs and delaminations which might result from such separation. The wedgelock also permits more precise and repeatable hole and other feature fabrication by more precisely locating an alignment fixture, such as a drill plate, relative to a structural assembly upon which fabrication operations are to be performed. The bushed spring loaded wedgelock comprises a standard, commercially-available wedgelock modified by attaching a bushing within which a spring loaded spacer is telescopically mounted. Like a standard wedgelock, the bushed spring loaded wedgelock is inserted through collinear holes in a drill plate or other alignment fixture and a structural assembly to clamp the assembly to the fixture. Even when used with a structural assembly with curved surfaces or thickness variations, the bushed spring loaded wedgelock clamps structural members together by forcing a spring loaded spacer against the front surface of the structural assembly while the shoulders of the wedgelock arms engage the rear surface of the structural assembly. A variety of wedgelock sizes and designs can be constructed to accommodate a range of alignment fixture, tooling hole and structural assembly geometries.

16 Claims, 3 Drawing Sheets

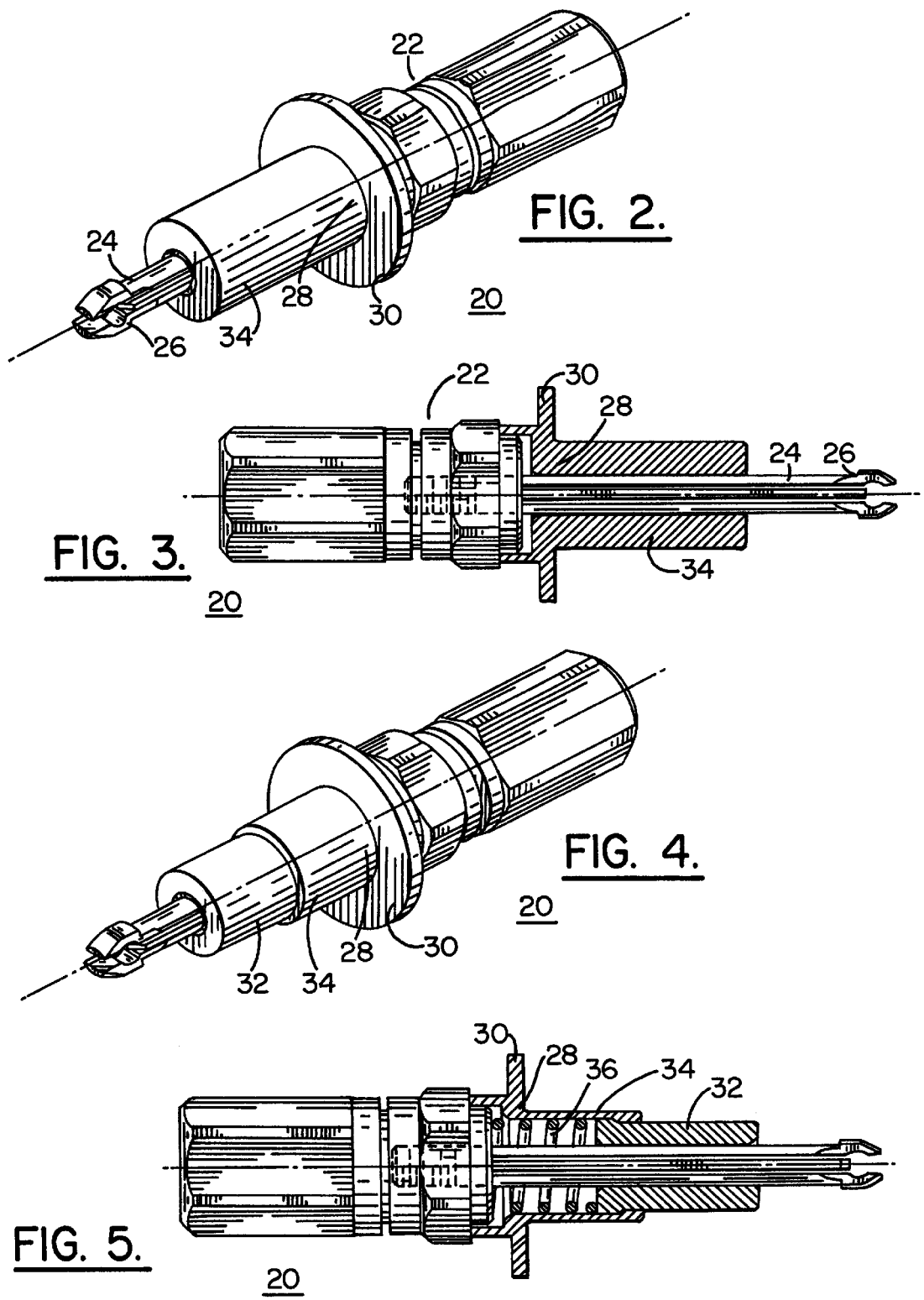

SPRING LOADED BUSHED WEDGELOCK

FIELD OF THE INVENTION

The present invention relates to clamping and fixturing for the fabrication and assembly of structures with the aid of a drill plate or other tooling fixture.

BACKGROUND OF THE INVENTION

The construction and assembly of a wide variety of equipment, including aircraft, ships, ground vehicles, test equipment and other equipment, frequently entails the fabrication of holes and other features in structural members and the installation of fasteners through such holes to assemble structural members. Holes must often be fabricated which extend through two or more layers of structural material, such as through multiple layers in an aircraft skin, or through two or more structural members, such as through an aircraft skin and an underlying stiffening rib. It is often important that such holes and features be located accurately relative to other features and that such holes and features be fabricated precisely so that the structural integrity of the equipment is maintained.

It is conventional in the construction and assembly of equipment with many features for complex sets patterns of holes and other features to be fabricated with the aid of a tooling fixture, such as a drill plate. If, for example, multiple identical assemblies must be constructed, such as for multiple wing assemblies on an aircraft production line, a durable, reusable drill plate in which a pattern of holes or features has been formed may be used as a template by which holes and features in each assembly may be fabricated. The use of a tooling fixture such as a drill plate helps to ensure that all holes in the assembly are precisely located relative to one another. The location of the hole pattern on the structure relative to other features of the structure (i.e. the "float" of the hole pattern over the structure) can be controlled by providing tooling points on the structure which mate to drill plate tooling points and which fix the location of the hole pattern relative to the remainder of the structure.

When holes must be fabricated which extend through two or more layers of structural material, such as through multiple layers in an aircraft skin, or through two or more structural members, such as through an aircraft skin and an underlying stiffening rib, there is often a tendency for the layers or members to separate slightly during fabrication operations. For example, when holes through multiple layers are fabricated with a drill, the forward pressure exerted by the drill operator on the assembly tends to force the layers apart as the drill passes through successive layers. When layers separate during fabrication, burrs and chips developed from the structural material by the fabrication tool may lodge between layers. Interlayer burrs and chips may prevent proper fastener attachment or pose other structural integrity problems.

The problem of separation of layers or members during fabrication is conventionally addressed by the use of wedgelocks, such as Monogram Aerospace Fasteners Tool Number TD391N1-X. Wedgelocks clamp the tooling plate firmly against the multiple layers or structural members by providing two or more flexible arms which are inserted through collinear holes in the tooling plate and the structural assembly and which engage the back side of the structural assembly by way of a shoulder at the tip of each arm. The opposing end of the wedgelock arms screws into a wedgelock head on the front side of the tooling plate, enabling an operator to adjust the clamping force of the wedgelock by twisting the wedgelock head. Wedgelocks are typically spaced every several inches across a tooling plate to evenly clamp the structural assembly to the tooling plate.

Conventional wedgelocks solve to some extent the problem of the separation of layers or members during the fabrication of holes to be drilled through flat surfaces and structural layers or members of uniform thickness, but curved surfaces and varying thicknesses present fabrication difficulties which conventional wedgelocks are unable to adequately overcome. In particular, conventional wedgelocks apply force to the back side of the structural assembly to pull the assembly toward the tooling plate, but the presence of curved surfaces and thickness variations will result in contact between the back side of the tooling plate and the front side of the structural assembly at only a few points. In those areas where the structural assembly is not drawn forcibly against the tooling plate by the conventional wedgelock, drilling or other fabrication operations may cause separation of layers or members, may introduce burrs or chips between layers, and may therefore result in irregular holes and fastener installation problems. The separation of layers results because the conventional wedgelock provides no force to clamp the layers or members together in those areas where the structural assembly is not drawn forcibly against the tooling plate because of surface curvature or thickness variations.

The introduction of burrs or chips between layers or members may be a significant problem during construction and assembly operations. If burrs and chips are not removed, there may be movement between structural parts during fastener installation. Burr and chip removal may entail expensive and time-consuming disassembly of structural assemblies.

Moreover, the diameter of the arms of a conventional wedgelock is often considerably smaller than diameter of the wedgelock alignment hole in the tooling plate to be clamped to the structural assembly, and misalignment may therefore result. There is thus a need for a tool which enables more precise alignment of tooling plates having larger wedgelock alignment hole diameters.

While conventional wedgelocks may adequately clamp a tooling plate to a flat and uniform multi-layer or multi-element assembly during fabrication operations requiring moderate hole location accuracy, there is a need for a tool which can enable more accurate tooling plate alignment and which can prevent separation of layers and elements in structural assemblies with curved surfaces and varying thicknesses during fabrication operations.

SUMMARY OF THE INVENTION

It is thereafter an object of the present invention to provide a wedgelock for precisely positioning and securing a plurality of aligned structural members to an alignment plate by extending through respective apertures defined by the alignment plate and the plurality of aligned structural members.

It is a further object of the invention to provide a wedgelock for securing a plurality of aligned structural members to an alignment plate by extending through respective apertures defined by the alignment plate and the plurality of aligned structural members such that the structural members are clamped together during subsequent machining operations.

These and other objects are provided, according to the present invention, by a wedgelock with a bushed spacer of diameter substantially equal to the diameter of a wedgelock tooling hole in an associated fabrication alignment plate and having a spring or other means for forcing the end of the spacer opposite the spring against the front side of the structural members to be clamped. In operation, an operator uses a tooling plate to accurately and repeatably guide a drill or other fabrication tool to and into a structural assembly workpiece so as to repeatably and accurately fabricate holes or other features in the structural assembly. The wedgelock is inserted through a tooling hole in the tooling plate and thence through a collinear hole in the structural assembly, which may comprise multiple layers or multiple members. Several other wedgelocks distributed relatively evenly over the tooling plate are inserted by the operator through similar sets of collinear holes through the tooling plate and the structural assembly to accurately fix the location of the tooling plate relative to the surface of the structural assembly. Shoulders extending outwardly from the arms of the wedgelock engage the back side of the structural assembly when the operator twists the head of the wedgelock to screw the arms toward the head. The operator can adjust the force with which the tooling plate is held against the structural assembly by the amount of torque applied to the head by hand or with a wrench. After all of the wedgelocks on the tooling plate have been so engaged and the tooling plate is firmly engaged with and accurately located relative to the structural assembly, the operator may commence drilling or other hole or feature fabrication operations on the structural assembly, using the tooling plate as a fabrication tool guide.

The bushed wedgelock provided by the present invention permits more precise alignment of the tooling plate to the structural assembly by providing a bushing with a diameter substantially equal to but less than the diameter of the tooling hole in the tooling plate.

When multi-layer structural assemblies with curved surfaces or varying thicknesses must be drilled or otherwise fabricated, the spring loaded spacer in the wedgelock of the present invention forcibly engages the structural assembly in regions in which the tooling plate is not in direct contact with the structural assembly, preventing separation of the structural layers or members and thus preventing the generation of excessive burrs or chips between structural layers or members which would be generated in the absence of any clamping force.

BRIEF DESCRIPTION OF THE DRAWINGS

FIG. 2 is a perspective view of a bushed wedgelock.

FIG. 3 depicts a partial cross-section of a bushed wedgelock.

FIG. 4 is a perspective view of a spring loaded bushed wedgelock.

FIG. 5 depicts a partial cross-section of a spring loaded bushed wedgelock.

FIG. 6A depicts the spring loaded bushed wedgelock, the tooling plate and the multi-layer structural assembly before insertion of the wedgelock.

FIG. 6B depicts the spring loaded bushed wedgelock inserted through the tooling plate and the multi-layer structural assembly, with the shoulders of the outwardly extending arms of the wedgelock engaging the back side of the structural assembly and the multiple layers of the structural assembly clamped together by the force of the compressed spring in the spring loaded bushed wedgelock.

FIG. 6C depicts the structural assembly secured to the tooling plate after an operator has twisted the head of the wedgelock to screw the arms toward the head.

DETAILED DESCRIPTION OF THE PREFERRED EMBODIMENTS

Figure 1:
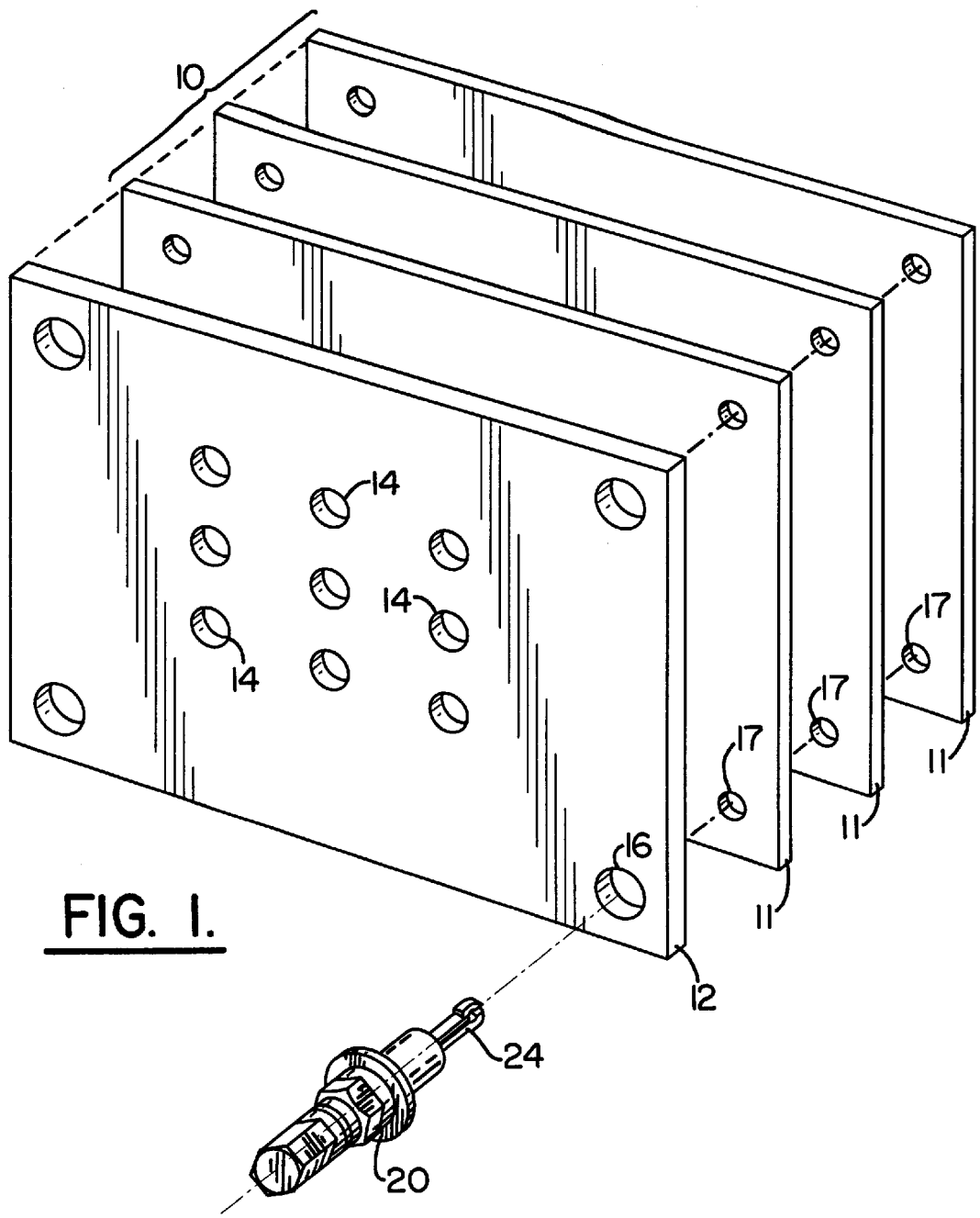
FIG. 1 illustrates the use of a wedgelock for holding a tooling plate to a structural assembly comprising multiple layers.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Structural assembly 10 in aircraft and other equipment may comprise multiple structural elements 11 which are typically constructed of metal, ceramic or graphite/epoxy laminate materials. Holes or other features in structural assembly 10 may be repeatably and precisely fabricated with the aid of an alignment plate 12 which defines template holes 14 through which a drill or other fabrication tool may be guided. Alignment plate 12 is typically constructed of a durable material and may be re-used to repeatably fabricate a common hole pattern through a plurality of structural assemblies 10, such as on an aircraft production line.

In order to repeatably and precisely fabricate holes or other features, alignment plate 12 must be clamped or otherwise held securely to structural assembly 10. This clamping or securing function is typically performed by one or more wedgelocks, such as Monogram Aerospace Fasteners Tool Number TD391N1-X. Arms 24 of wedgelock 20 are inserted through alignment plate tooling holes 16, which are collinear with respective structural member tooling holes 17. Shoulders 26 at the end of arms 24 engage the rear surface of structural assembly 10, and arms 24, which are rotatably engaged with head 22 of wedgelock 20, are drawn to head 22 by an operator twisting head 22 with a wrench or by hand until alignment plate 12 is clamped or otherwise held securely to structural assembly 10. Other wedgelocks 20 are spaced evenly across the surface of alignment plate 12 to forcibly clamp structural assembly 10 to alignment plate 12. Hole drilling or other fabrication operations are then performed on structural assembly 10 through alignment plate 12. Alignment plate 12 is typically re-used to fabricate substantially identical sets of holes or other features on additional structural assemblies 10 in a production or assembly line environment, such as on an aircraft assembly line.

In one embodiment, shown in FIGS. 2 and 3, bushed wedgelock 20 includes bushing 28 which has a bushing flange 30 for contacting the front side of alignment plate 12 and a sleeve portion 34 with length no greater than the thickness of alignment plate 12 and with diameter substantially equal to but less than the diameter of alignment plate tooling hole 16. After arms 24 are inserted through alignment plate tooling holes 16 and respective structural member tooling holes 17, shoulders 26 at the end of arms 24 engage the rear surface of structural assembly 10. An operator draws arms 24 to head 22 by twisting head 22 until bushing flange 30 is held securely to structural assembly 10 and alignment plate 12 is held securely to structural assembly 10. Because the length and diameter of sleeve portion 34 are chosen with knowledge of the dimensions of alignment plate tooling hole 16, alignment plate 12 is precisely located relative to structural member 11.

In the preferred embodiment, shown in FIGS. 4 and 5, spring loaded bushed wedgelock 20 includes bushing 28, spacer 32 and compressed spring 36. Bushing 28 has a bushing flange 30 for contacting the front side of alignment plate 12 and a sleeve portion 34 with length no greater than the thickness of alignment plate 12 and with diameter substantially equal to but less than the diameter of alignment plate tooling hole 16. Spacer 32 has a diameter substantially equal to but less than the diameter of alignment plate tooling hole 16 and greater than the diameter of structural member tooling hole 17. Spacer 32 is preferably telescopically mounted within and retained by bushing 28 by an inwardly-extending lip on bushing 28 engaging an outwardly-extending lip on spacer 32.

Figure 6A:
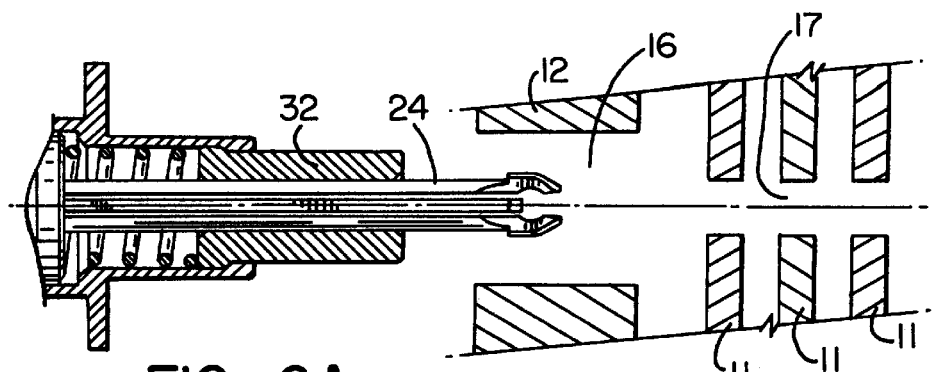
FIGS. 6A, 6B and 6C illustrate the use of a spring loaded bushed wedgelock to clamp multiple layers of a structural assembly together while securing a tooling plate to the structural assembly.
Figure 6B:
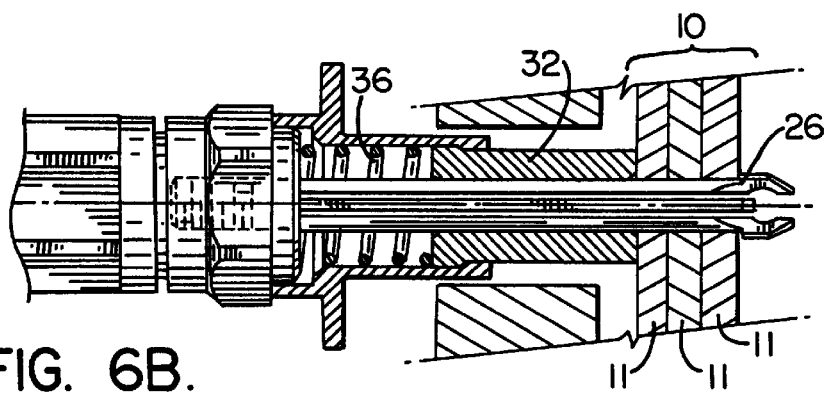
Figure 6C:
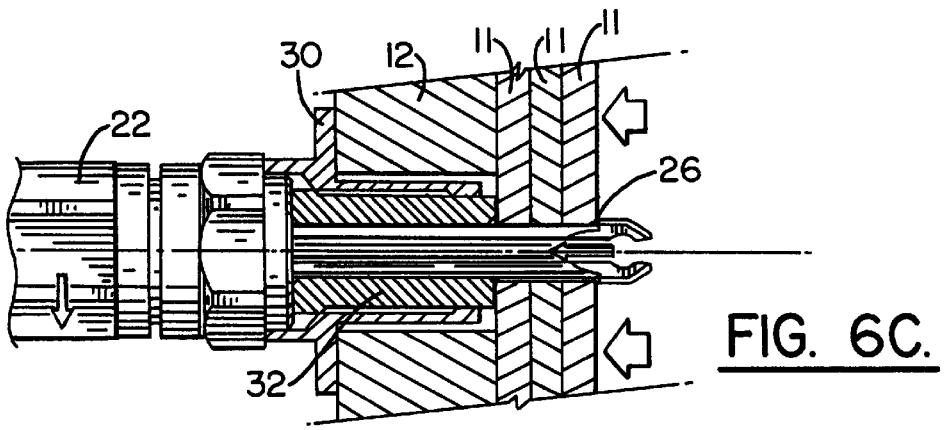

FIGS. 6A, 6B and 6C illustrate the operation of the spring loaded bushed wedgelock. After arms 24 are inserted through alignment plate tooling holes 16 and respective structural member tooling holes 17, shoulders 26 at the end of arms 24 engage the rear surface of structural assembly 10 and compressed spring 36 forces spacer 32 against the front side of structural assembly 10. Structural members 11 are clamped together by opposing forces from spacer 32 and shoulders 26. An operator draws arms 24 to head 22 by twisting head 22 until bushing flange 30 is held securely to structural assembly 10 and alignment plate 12 is held securely to structural assembly 10. Structural members 11 remain clamped together by opposing forces from shoulders 26 and spacer 32, even for structural assemblies with curved surfaces or varying thicknesses, preventing the separation of structural members 11 during drilling or other fabrication operations and precluding the formation of burrs and delaminations which might result from such separation.

Bushed spring loaded wedgelock 20 is preferably assembled by inserting spacer 32 and spring 36 into bushing 28 and then press fitting bushing 28 onto a standard wedgelock, such as Monogram Aerospace Fasteners Tool Number TD391N1-X. Bushed wedgelocks and bushed spring loaded wedgelocks for a variety of tooling plate thicknesses and alignment plate tooling hole diameters may be constructed from a range of standard, commercially-available wedgelocks by appropriate choice of bushing and spacer dimensions.

That which is claimed is:

1. A wedgelock for securing a plurality of aligned structural members to an alignment plate by extending through respective apertures defined by the alignment plate and the plurality of aligned structural members, wherein the alignment plate has a predetermined thickness and defines an aperture having a first predetermined diameter, the wedgelock comprising:
   a rotatable head portion;
   a pair of arms for extending through the respective apertures defined by the alignment plate and the plurality of aligned structural members, each arm having opposed first and second ends wherein the first end rotatably engages said head portion and wherein the second end includes an outwardly extending shoulder for engaging a rear surface of the aligned structural members;
   a bushing, operably connected to said rotatable head portion, for extending at least partially through the aperture defined by the alignment plate, said bushing comprising a flange for contacting a front surface of the alignment plate and a sleeve portion for extending within the aperture defined by the alignment plate, wherein the sleeve portion has a length no greater than the predetermined thickness of the alignment plate and a diameter substantially equal to the predetermined diameter of the aperture of the alignment plate such that the wedgelock is securely mounted to the alignment plate; and
   a spacer having a first end disposed within said bushing and a second end for contacting a front surface of the aligned structural members.

2. A wedgelock according to claim 1 further comprising means for biasing said spacer into contact with the front surface of the aligned structural members such that the structural members are clamped together during subsequent machining operations.

3. A wedgelock according to claim 2 wherein said means for biasing said spacer comprises a spring in compression disposed within said bushing in operable contact with the first end of said spacer for urging said spacer into contact with the first surface of the aligned structural members.

4. A wedgelock according to claim 1 wherein said bushing and said spacer cooperate to retain at least a first end of said spacer within said bushing.

5. A wedgelock according to claim 1 wherein the apertures defined by the plurality of aligned structural members have a second predetermined diameter, and wherein said spacer has a diameter that is less than the first predetermined diameter of the aperture defined by said alignment plate and greater than the second predetermined diameter of the apertures defined by said plurality of aligned structural members.

6. A wedgelock for securing a plurality of aligned structural members to an alignment plate by extending through respective apertures defined by the alignment plate and the plurality of aligned structural members, the wedgelock comprising:
   a head portion;
   an engagement member extending outwardly from said head portion through the respective apertures defined by the alignment plate and the plurality of aligned structural members and engaging a rear surface of the aligned structural members;
   a bushing for extending at least partially through the aperture defined by the alignment plate, said bushing being operably connected to said head portion and at least partially surrounding a medial portion of said engagement member;
   a spacer having a first end disposed within said bushing and a second end for contacting a front surface of the aligned structural members; and
   means for biasing said spacer into contact with the front surface of the aligned structural members such that the structural members are clamped together during subsequent machining operations.

7. A wedgelock according to claim 6 wherein said means for biasing said spacer comprises a spring in compression disposed within said bushing in operable contact with the first end of said spacer for urging said spacer into contact with the first surface of the aligned structural members.

8. A wedgelock according to claim 6 wherein said spacer is mounted for telescopic movement relative to said bushing.

9. A wedgelock according to claim 8 wherein said bushing and said spacer cooperate to retain at least a first end of said spacer within said bushing.

10. A wedgelock according to claim 6 wherein the aperture defined by said alignment plate has a first predetermined diameter and the apertures defined by the plurality of aligned structural members have a second predetermined diameter, and wherein said spacer has a diameter that is less than the first predetermined diameter of the aperture defined by said alignment plate and greater than the second predetermined diameter of the apertures defined by said plurality of aligned structural members.

11. A wedgelock according to claim 6 wherein said bushing comprises a flange for contacting a front surface of the alignment plate and a sleeve portion for extending within the aperture defined by the alignment plate.

12. A wedgelock according to claim 6 wherein the alignment plate has a predetermined thickness and defines an aperture having a predetermined diameter, and wherein the sleeve portion of said bushing has a length no greater than the predetermined thickness of the alignment plate and a diameter substantially equal to the predetermined diameter of the aperture of the alignment plate.

13. A wedgelock for securing a plurality of aligned structural members to an alignment plate by extending through respective apertures defined by the alignment plate and the plurality of aligned structural members, the wedgelock comprising:

a head portion;

an engagement member extending outwardly from said head portion through the respective apertures defined by the alignment plate and the plurality of aligned structural members and engaging a rear surface of the aligned structural members;

a bushing extending at least partially through the aperture defined by the alignment plate; and a spacer having a first end disposed within said bushing and a second end for contacting a front surface of the aligned structural members, wherein said spacer is biased into contact with the front surface of the aligned structural members to thereby clamp the plurality of aligned structural members together into a structural assembly independent of contact between the aligned structural members and the alignment plate such that retraction of said engagement portion draws the entire structural assembly toward a rear surface of the alignment plate.

14. A wedgelock according to claim 13 wherein said means for clamping the plurality of aligned structural members together further comprises a spring in compression which biases said spacer into contact with the front surface of the aligned structural members.

15. A wedgelock according to claim 13 wherein said bushing and said spacer cooperate to retain at least a first end of said spacer within said bushing.

16. A wedgelock according to claim 13 wherein the aperture defined by said alignment plate has a first predetermined diameter and the apertures defined by the plurality of aligned structural members have a second predetermined diameter, and wherein said spacer has a diameter that is less than the first predetermined diameter of the aperture defined by said alignment plate and greater than the second predetermined diameter of the apertures defined by said plurality of aligned structural members.

* * * * *